(12) United States Patent
Nakano et al.

(10) Patent No.: US 10,777,335 B2
(45) Date of Patent: Sep. 15, 2020

(54) COATED ELECTRIC WIRE FOR WINDING

(71) Applicant: TOYOTA JIDOSHA KABUSHIKI KAISHA, Toyota-shi, Aichi (JP)

(72) Inventors: Yukiko Nakano, Toyota (JP); Sumio Shirai, Toyota (JP); Yoshinobu Murakami, Toyohashi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/749,867

(22) Filed: Jan. 22, 2020

(65) Prior Publication Data

US 2020/0243217 A1 Jul. 30, 2020

(30) Foreign Application Priority Data

Jan. 28, 2019 (JP) ................. 2019-011810

(51) Int. Cl.
*H01B 7/02* (2006.01)
*H02K 3/02* (2006.01)
*H01B 3/30* (2006.01)

(52) U.S. Cl.
CPC .............. *H01B 7/02* (2013.01); *H01B 3/306* (2013.01); *H02K 3/02* (2013.01)

(58) Field of Classification Search
CPC . H01B 7/02; H01B 7/04; H01B 3/306; H02K 3/02

USPC ............. 174/110 R, 110 SR–110 PM, 174/120 R–122 SR

See application file for complete search history.

(56) References Cited

U.S. PATENT DOCUMENTS

| | | | |
|---|---|---|---|
| 9,424,961 B2 * | 8/2016 | Oya | H02K 3/34 |
| 9,443,643 B2 * | 9/2016 | Muto | H01B 7/0216 |
| 9,728,296 B2 * | 8/2017 | Oya | H01B 13/14 |
| 2012/0279752 A1 * | 11/2012 | Oya | H01B 3/303 |
| | | | 174/110 SR |

FOREIGN PATENT DOCUMENTS

| | | |
|---|---|---|
| JP | 2008-278664 A | 11/2008 |
| JP | 2011-238384 A | 11/2011 |
| JP | 2012-113836 A | 6/2012 |

* cited by examiner

*Primary Examiner* — William H. Mayo, III
(74) *Attorney, Agent, or Firm* — Dickinson Wright PLLC

(57) ABSTRACT

A coated electric wire for winding that includes an insulation coating including appropriate pores in a resin to suppress erosion due to partial discharge is provided. The present disclosure relates to a coated electric wire for winding that includes a conductor and an insulation coating that coats a periphery of the conductor, wherein the insulation coating includes a constant volume of pores having an average diameter equal to or more than a pore diameter (A) obtained by a specific measuring method.

2 Claims, 18 Drawing Sheets

COATED ELECTRIC WIRE FOR WINDING

CROSS REFERENCE TO RELATED APPLICATIONS

The present application claims priority from Japanese patent application JP 2019-011810 filed on Jan. 28, 2019, the content of which is hereby incorporated by reference into this application.

BACKGROUND

Technical Field

The present disclosure relates to a coated electric wire for winding used for a motor coil (winding) and the like.

Description of Related Art

For most motors mounted on vehicles including a drive motor for a hybrid vehicle, an electric vehicle, and the like, technology development for downsizing and higher output power has been continuously performed. One measure to achieve both objectives includes increasing a space factor of a winding in slots of a stator core. To increase a magnetic field, a current sent to the winding needs to be increased.

As described above, sending a large current to a winding having a high space factor ensures an enhanced output and higher efficiency by a downsized electric motor, while a copper loss, an eddy-current loss, an iron loss, and the like are increased. A heat due to these losses causes deterioration of an insulation coating.

To avoid the deterioration of the insulation coating due to the heat, for example, JP 2008-278664 A discloses a winding used for an electric motor, wherein the winding includes an oxygen free copper conductor which contains 99.96% by weight or more of copper and 0.005% by weight or less of oxygen and an insulator layer which coats the conductor and is made of an organic resin containing an inorganic filler.

In addition to the above-described deterioration of the insulation coating due to the heat, sending the large current possibly causes a problem of partial discharge. Sending a current generates an electric potential difference between windings, between a winding and a core, and the like. At the position having the electric potential difference, the partial discharge is easily generated when an insulation property is insufficient, for example, when the insulation coating is thin and/or an insulation distance is insufficient. The partial discharge erodes the insulation coating on a surface of the winding to cause decreased insulation property, or dielectric breakdown at the worst case.

To suppress the occurrence of the partial discharge, for example, JP 2011-238384 A discloses an insulated electric wire whose conductor has an outer periphery coated with an insulation coating, wherein the insulation coating is formed of a cured material of a thermosetting resin composition containing a thermoplastic resin and the insulation coating includes fine pores having an average diameter of 1 μm or less.

Furthermore, JP 2012-113836 A discloses an insulation-coated conductor wire that includes a conductor wire and a porous resin coating, wherein the porous resin coating coats a surface of the conductor wire and includes voids that have a maximum void diameter less than a critical void diameter corresponding to an intersection point of a void voltage characteristic line, which indicates a relation between void voltage as a voltage applied to the void and void diameter, and a Paschen curve.

However, it is difficult to ensure fine pores (in other words, "air hole," "vacancy," or "void") having the average diameter of 1 μm or less in the resin as JP 2011-238384 A.

While JP 2012-113836 A uses the Paschen curve to obtain the maximum void diameter, the Paschen curve is a curve obtained by actual measurement of a relation between distance between metal electrodes and voltage, at which a discharge occurs, in an atmosphere. Therefore, the environment used for obtaining the Paschen curve is different from an actual environment of the pores present in the resin as an embodiment, for example, a relation between pore size and voltage at which a discharge occurs, a failure mode in a resin, and a voltage and electric field distribution.

Therefore, the present disclosure provides a coated electric wire for winding that includes an insulation coating including appropriate pores in a resin to suppress erosion due to partial discharge.

SUMMARY

The present inventors have conducted concentrated studies concerning a coated electric wire for winding, and found that, in a coated electric wire for winding that includes a conductor and an insulation coating that coats a periphery of the conductor, when the insulation coating includes a constant volume of pores having an average diameter equal to or more than a pore diameter (A) obtained by a specific measuring method, erosion due to partial discharge can be suppressed and insulation lifetime of the coated electric wire for winding can be improved. Thus, the inventors achieved the present disclosure.

That is, the gist of the present disclosure is as follows.
(1) A coated electric wire for winding comprising a conductor and an insulation coating that coats a periphery of the conductor, wherein the insulation coating includes pores and an insulating resin, wherein the insulation coating includes the pores in an amount of 25% by volume to 75% by volume based on a total volume of the insulation coating in the insulating resin, and wherein an average diameter of the pores obtained from a SEM image of a cross section of the insulation coating when the electric wire is cut perpendicular to a longitudinal direction thereof is in a range from a pore diameter (A) obtained through the following steps (i) to (vi) to ⅓ of an insulation coating thickness:

(i) a step of preparing a specimen having one first pore or one first hollow silica particle disposed between mutually opposed two electrodes in an insulating resin;

(ii) a step of applying a voltage between the mutually opposed two electrodes of the specimen prepared in the step (i) and measuring a partial-discharge inception voltage (PDIV);

(iii) a step of obtaining a first shared voltage Va of the first pore or a pore in the first hollow silica particle from the PDIV measured in the step (ii) based on a formula below;

$$Va = \frac{3\varepsilon_{r-e} \times V \times d_a}{(\varepsilon_{r-a} + 2\varepsilon_{r-e}) \times d}[Vp] \qquad [\text{Math. 1}]$$

[In the formula, $\varepsilon_{r-e}$ is a relative permittivity of the insulating resin, V is the PDIV measured in the step (ii), $d_a$ is a first pore diameter of the first pore or the first hollow silica particle, $\varepsilon_{r-a}$ is a relative permittivity of air, and d is a distance between the mutually opposed two electrodes]

(iv) a step of performing the steps (i) to (iii) for at least one type of second or later pore or hollow silica particle having a second or later pore diameter different from the first pore diameter of the first pore or the first hollow silica particle used in the step (i) to obtain a second or later shared voltage Va with respect to the second or later pore diameter $d_a$ of the second or later pore or hollow silica particle;

(v) a step of plotting a value represented by the first shared voltage Va versus the first pore diameter $d_a$ of the first pore or the first hollow silica particle obtained in the step (iii) and at least one value represented by the second or later shared voltage Va versus the second or later pore diameter $d_a$ of the second or later pore or hollow silica particle obtained in the step (iv) to generate a curve in a relationship diagram between the pore diameter (x-axis) and the voltage (y-axis); and (vi) a step of obtaining the pore diameter (A) for a withstand voltage required for the insulation coating from the curve obtained in the step (v).

(2) The coated electric wire for winding according to (1), wherein the insulation coating thickness is 20 μm to 150 μm.

Effects

The present disclosure provides a coated electric wire for winding that includes an insulation coating including appropriate pores in a resin to suppress erosion due to partial discharge.

DETAILED DESCRIPTION OF THE EMBODIMENTS

Figure 1:
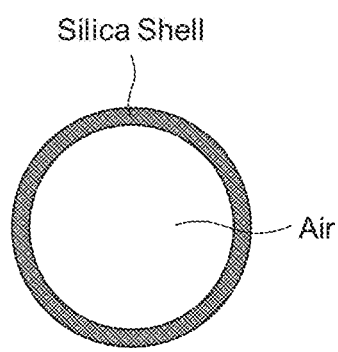
FIG. 1 is a schematic drawing illustrating a hollow silica particle.

The following describes embodiments of the present disclosure in detail.

In this description, the present disclosure will be described with reference to the drawings appropriately. In the drawings, dimensions and shapes of respective portions are exaggerated for clarification, and the drawings do not accurately illustrate actual dimensions and shapes. Accordingly, the technical scope of the present disclosure is not limited to the dimensions and the shapes of the respective portions illustrated in the drawings. The coated electric wire for winding of the present disclosure is not limited to the following embodiments, and can be performed in various configurations where changes, improvements, and the like which a person skilled in the art can make are given without departing from the gist of the present disclosure.

The present disclosure relates to a coated electric wire for winding that includes a conductor and an insulation coating that coats a periphery of the conductor, wherein the insulation coating includes a constant volume of pores having an average diameter equal to or more than a pore diameter (A) obtained by a specific measuring method.

Here, the conductor is a conductor wire obtained by forming a conductive material in a string (wire) shape. The conductor can include a conductor ordinarily used in the technical field. While the conductor is not limited, the conductor can include, for example, a copper wire and an aluminum wire. In some embodiments, the conductor may be the copper wire because of advantages of a high electrical conductivity and a good workability.

While the shape of the conductor is not limited, the shape of the conductor can include, for example, a round wire shape and a flat wire shape. In some embodiments, the shape of the conductor may be the flat wire shape because of an advantage of improving a space factor on a slot cross section in the case of winding.

The conductor can include, for example, an oxygen free copper and a tough pitch copper.

The insulation coating includes an insulating resin and pores.

The pores in the insulation coating may be formed of a hollow material (material internally containing air). In this case, the insulation coating includes the insulating resin and the hollow material.

In some embodiments, the insulation coating may include the insulating resin and the pores from an aspect of decreasing permittivity of the insulation coating.

The insulating resin (in other words, simply referred to as "resin" in this description and the like) can include an insulating resin ordinarily used in the technical field. While the insulating resin is not limited, the insulating resin can include a polyimide (PI) resin, a polyamide resin, a polyamide imide (PAI) resin, a polyphenylene sulfide (PPS) resin, a polyether ether ketone resin, a polyphenylsulfone resin, an enamel resin, a polytetrafluoroethylene (PTFE) resin, and the like. In some embodiments, the insulating resin may be the polyimide resin because of excellent advantages in heat resistance, reaction resistance (hydrolysis resistance and the like), deformation resistance, and insulation property (low dielectricity).

The insulating resin can include, for example, a polyimide resin manufactured by I.S.T Corporation.

When the pores in the insulation coating are formed of the hollow materials, the material of the hollow material includes the insulating resin, an inorganic filler, and the like. The inorganic filler includes an insulating material having an insulation property. In some embodiments, the inorganic filler may be an inorganic filler having a permittivity equivalent to that of the insulating resin. While the inorganic filler is not limited, the inorganic filler includes silica, alumina, magnesia, beryllium oxide, silicon carbide, titanium carbide, boron carbide, tungsten carbide, boron nitride, silicon nitride, and the like. In some embodiments, the inorganic filler may be silica in view of the insulation property and manufacturing stability. Accordingly, in some embodiments, the hollow material may be hollow silica particles as schematically illustrated in FIG. 1.

The hollow material may be surface-treated. A surface treatment agent can include a surface treatment agent ordinarily used in the technical field. While the surface treatment agent is not limited, the surface treatment agent can include, for example, a silane coupling agent. The hollow material is surface-treated to improve compatibility and dispersibility in resin of the hollow material, thus providing an advantage of avoiding local aggregation in the resin of the hollow material.

The shape of the pore in the insulation coating is not limited. In some embodiments, the shape of the pore in the insulation coating may be a spherical shape. Here, the spherical shape does not necessarily mean an exactly spherical shape but includes various shapes including an oval shape, such as a prolate spherical shape and an oblate spherical shape, and a doughnut shape. For example, when the hollow material is used, a hollow spherical shape of the hollow material provides an advantage of ease in controlling the sizes of the pores in the insulation coating.

In some embodiments, the pores next to one another in the insulation coating may be each independent without mutually passing to be connected. The mutually independent pores in the insulation coating can ensure the reduced permittivity of the insulation coating and suppress tearing during the treatment of the insulation coating and the like.

The insulation coating includes the pores in an amount of 25% by volume to 75% by volume based on a total volume of the insulation coating in the insulating resin. In some embodiments, the insulation coating may include the pores in an amount of 25% by volume to 50% by volume based on a total volume of the insulation coating in the insulating resin. In other words, a porosity of the insulation coating is 25% to 75%. In some embodiments, the porosity of the insulation coating may be 25% to 50%.

Here, the amount (volume) of the pores included in the insulation coating or the porosity of the insulation coating can be obtained with an amount of the hollow material used for forming the pores or by a method ordinarily used in the technical field, for example, an Archimedes method, a gravimetric porosity method, a mercury porosity method and the like.

Alternatively, an area proportion of the pores in the insulation coating {(pore area/insulation coating area, in a cross section of insulation coating)×100} is 25% to 75%. In some embodiments, the area proportion of the pores in the insulation coating may be 25% to 50%.

Here, the area proportion of the pores in the insulation coating can be calculated as a proportion of an area of the pores to an area of the whole insulation coating in a scanning electron microscope (SEM) image of the cross section of the insulation coating when the electric wire is cut perpendicular to its longitudinal direction. For example, the proportion may be an average value of proportions calculated in respective visual field ranges when three to ten visual field ranges of 100 μm×100 μm are randomly selected as the SEM images of the cross section of the insulation coating.

The insulation coating includes the pores in an amount of the above-described range to reduce the permittivity of the insulation coating and improve a withstand voltage.

The average diameter of the pores in the insulation coating is in a range from the pore diameter (A) obtained by the following steps (i) to (vi) to ⅓ of an insulation coating thickness. In other words, a lower limit value of the average diameter of the pores in the insulation coating is obtained by the following steps (i) to (vi), and an upper limit value of the average diameter of the pores in the insulation coating is 1/3 of the insulation coating thickness.

Step (i)

In an insulating resin, a specimen in which one first pore or one first hollow silica particle is provided between mutually opposed two electrodes is prepared.

Here, while the insulating resin is not limited, for example, the above-described insulating resin can be used. In some embodiments, the insulating resin may be the same as the above-described insulating resin.

As the mutually opposed two electrodes, electrodes ordinarily used in the technical field can be used, and the mutually opposed two electrodes are not limited. The mutually opposed two electrodes can include a metal conductive tape made of aluminum, copper, and the like.

As the first hollow silica particle, a hollow silica particle ordinarily used in the technical field can be used. The hollow silica particle is, for example, Sphericel manufactured by Potters-Ballotini Co., Ltd.

The first pore diameter or the particle size of the first hollow silica particle is ordinarily 0.1 μm to 100 μm. The first pore diameter or the particle size of the first hollow silica particle is a measured value through a cross-section observation of the first pore diameter or the particle size of the first hollow silica particle. The cross-section observation of the first pore or the first hollow silica particle can be performed by a method ordinarily used in the technical field, and for example, an optical microscope can be used for the measurement.

While a distance between the mutually opposed two electrodes is not limited, the distance is ordinarily 100 μm to 1000 μm. In some embodiments, the distance between the mutually opposed two electrodes may be 250 μm to 500 μm.

In some embodiments, the first pore or the first hollow silica particle may be positioned at the center between the mutually opposed two electrodes.

For example, in Step (i), the specimen can be prepared as follows. First, the insulating resin is placed on a glass substrate, and metal tapes, for example, copper tapes or aluminum tapes, having a thickness of 50 μm to 200 μm, for example, 70 μm, 80 μm, or 160 μm, are disposed separated by a distance, for example, 250 μm to 500 μm to form an electrode system. Subsequently, a micromanipulator is used to dispose one first hollow silica particle between the electrodes. Here, instead of the first hollow silica particle, one first pore may be provided between the electrodes using a pipette, a syringe, and the like. Subsequently, the prepared specimen is cured based on a curing method for the used insulating resin, for example, by heating for a thermosetting resin, or by leaving at room temperature for a room-temperature curing resin.

Accordingly, the specimen prepared in Step (i) includes the insulating resin, the mutually opposed two electrodes disposed in the insulating resin, and the first pore or the first hollow silica particle provided between the two electrodes. In some embodiments, the specimen prepared in Step (i) includes the insulating resin, the mutually opposed two electrodes disposed in the insulating resin, and the first pore or the first hollow silica particle provided at the center between the two electrodes.

Step (ii)

A voltage is applied between the mutually opposed two electrodes of the specimen prepared in Step (i) to measure a partial-discharge inception voltage (PDIV).

More specifically, respective terminals are connected to the mutually opposed two electrodes of the specimen prepared in Step (i) such that one electrode becomes positive (anode) and the other electrode becomes negative (cathode). With the start of applying the voltage between the mutually opposed two electrodes to increase the voltage, the PDIV is measured.

Step (iii)

From the PDIV measured in Step (ii), a first shared voltage Va of the first pore (air) or a pore (air) in the first hollow silica particle is calculated.

Here, the first shared voltage Va of the first pore or the pore in the first hollow silica particle is obtained based on the following formula.

$$Va = \frac{3\varepsilon_{r-e} \times V \times d_a}{(\varepsilon_{r-a} + 2\varepsilon_{r-e}) \times d} [Vp] \qquad [\text{Math. 2}]$$

In the formula, $\varepsilon_{r-e}$ is a relative permittivity of the insulating resin, and varies depending on the insulating resin used for preparing the specimen. When polyimide is used as the insulating resin, $\varepsilon_{r-e}$ is 3.0 to 3.5.

In the formula, V is the PDIV measured in Step (ii).

In the formula, $d_a$ is a first pore diameter of the first pore or the first hollow silica particle. The first pore diameter of the first hollow silica particle is a value obtained by subtracting shell thicknesses from the particle size of the first hollow silica particle, and the measured value through the cross-section observation of the first pore diameter of the first hollow silica particle. The first pore diameter of the first pore is the measured value through the cross-section observation of the first pore. The cross-section observation of the first pore or the first hollow silica particle can be performed by a method ordinarily used in the technical field, and for example, an optical microscope can be used for the measurement. The shell thickness of the first hollow silica particle is ordinarily 0.1 μm to 10 μm, and the first pore diameter of the first pore or the first hollow silica particle is ordinarily 0.1 μm to 100 μm.

In the formula, $\varepsilon_{r-a}$ is a relative permittivity of air, and $\varepsilon_{r-a}$ is 1.

In the formula, d is the distance between the mutually opposed two electrodes, and d is ordinarily 100 μm to 1000 μm as described above. In some embodiments, d may be 250 μm to 500 μm as described above.

Step (iv)

For at least one type of second or later pore or hollow silica particle having a second or later pore diameter different from the first pore diameter of the first pore or the first hollow silica particle used in Step (i), the above-described steps (i) to (iii) are performed to obtain a second or later shared voltage Va with respect to the second or later pore diameter $d_a$ of the second or later pore or hollow silica particle.

The second or later pore diameter of the second or later pore or hollow silica particle is not limited insofar as the second or later pore diameter is different from the first pore diameter of the first pore or the first hollow silica particle used in Step (i), and the second or later pore diameter of the second or later pore or hollow silica particle is ordinarily 0.1 μm to 100 μm similarly to the first pore diameter of the first pore or the first hollow silica particle used in Step (i). Obviously, the first pore or the first hollow silica particle used in Step (i) can be used as any one type of the second or later pore or hollow silica particle used in Step (iv), and any one type of the second or later pore or hollow silica particle used in Step (iv) can be used in Step (i).

Step (v)

In a relationship diagram between the pore diameter (x-axis) and the voltage (y-axis), a value represented by the first shared voltage Va versus the first pore diameter $d_a$ of the first pore or the first hollow silica particle obtained in step (iii) and at least one value represented by the second or later shared voltage Va versus the second or later pore diameter $d_a$ of the second or later pore or hollow silica particle obtained in step (iv) are plotted to generate a curve.

Step (vi)

From the curve obtained in Step (v), the pore diameter (A) for a withstand voltage required for the insulation coating is obtained.

In Step (vi), the pore diameter (A) for the withstand voltage required for the insulation coating is a corresponding value of the x-axis when the y-axis indicates the withstand voltage required for the insulation coating on the curve obtained in Step (v).

The withstand voltage required for the insulation coating is a withstand voltage required per pore in the insulation coating. The withstand voltage required for the insulation coating varies depending on the use of the coated electric wire for winding including the insulation coating. The withstand voltage required for the insulation coating is ordinarily 0.4 kVp to 2 kVp. More specifically, the withstand voltage required for the insulation coating is ordinarily 1.2 kVp to 2 kVp when the coated electric wire for winding including the insulation coating is used for a motor required to have a high withstand voltage.

The lower limit value of the average diameter of the pores in the insulation coating can be obtained through the above-described steps (i) to (vi), and thereby decrease in insulation property and decrease in mechanical strength (extension) due to connection of the pores can be suppressed, and thus the reduced permittivity of the insulation coating can be ensured. Especially, since the lower limit value of the average diameter of the pores in the insulation coating is obtained based on the withstand voltage required for the insulation coating in Step (vi), the finally obtained PDIV of the coated electric wire for winding of the present disclosure is the constant value or more.

Figure 2:
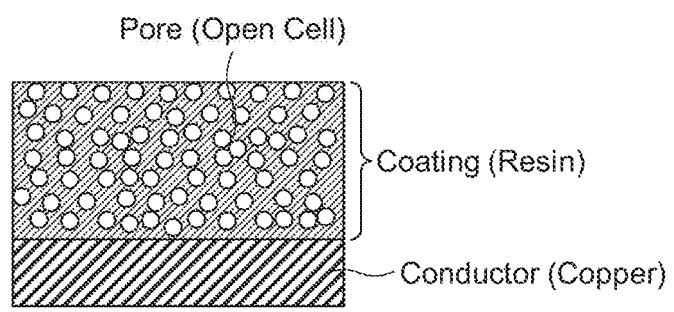
FIG. 2 is a schematic drawing illustrating an enlarged part of an insulation coating of a coated electric wire for winding that includes the insulation coating in a case where an average diameter of pores in the insulation coating is smaller than a pore diameter (A) obtained by a specific measuring method in the present disclosure.

FIG. 2 is a schematic drawing illustrating an enlarged part of an insulation coating of a coated electric wire for winding that includes the insulation coating in a case where an average diameter of pores in the insulation coating is smaller than the pore diameter (A) obtained through the above-described steps (i) to (vi). In this case, for the pores in the insulation coating, the pores next to one another are connected to form open cells, and the open cells possibly causes tearing during the treatment of the insulation coating and poor insulation.

The upper limit value of the average diameter of the pores in the insulation coating is ⅓ of the insulation coating thickness.

The insulation coating thickness varies depending on the use of the coated electric wire for winding including the insulation coating. While the insulation coating thickness is not limited, the insulation coating thickness is ordinarily 20 μm to 150 μm. More specifically, the insulation coating thickness is ordinarily 60 μm to 150 μm when the coated electric wire for winding including the insulation coating is used for a motor required to have a high withstand voltage.

The insulation coating thickness can be set to the above-described coating thickness, and thereby a volume proportion of the conductor can be ensured.

Accordingly, the upper limit value of the average diameter of the pores in the insulation coating varies depending on the use of the coated electric wire for winding including the insulation coating. While the upper limit value of the average diameter of the pores in the insulation coating is not limited, the upper limit value of the average diameter of the pores in the insulation coating is ordinarily 6 μm to 50 μm. More specifically, the upper limit value of the average diameter of the pores in the insulation coating is ordinarily 20 μm to 50 μm when the coated electric wire for winding including the insulation coating is used for a motor required to have a high withstand voltage.

The upper limit value of the average diameter of the pores in the insulation coating can be ⅓ of the insulation coating thickness, and thereby partial shortage of the pores in the insulation coating can be suppressed, and thus the reduced permittivity can be ensured.

Figure 3:
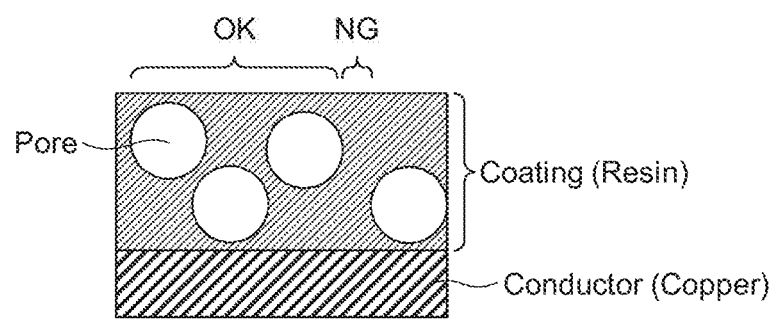
FIG. 3 is a schematic drawing illustrating an enlarged part of an insulation coating of a coated electric wire for winding that includes the insulation coating in a case where an average diameter of pores in the insulation coating is larger than ⅓ of an insulation coating thickness.

FIG. 3 is a schematic drawing illustrating an enlarged part of an insulation coating of a coated electric wire for winding that includes the insulation coating in a case where an average diameter of the pores in the insulation coating is larger than ⅓ of the insulation coating thickness. In FIG. 3, OK indicates a part where the pores are present in the shortest distance between the insulation coating surface and the conductor, and NG indicates a part where the pores are absent in the shortest distance between the insulation coating surface and the conductor. In NG, the partial discharge easily occurs. Accordingly, in this case, unevenness of the presence/absence of the pores formed in the insulation coating possibly causes the poor insulation.

The average diameter of the pores in the insulation coating can be obtained as an average value of equivalent circle diameters obtained from the areas of the respective pores in the SEM image of the cross section of the insulation coating when the electric wire is cut perpendicular to the longitudinal direction. For example, the average diameter of the pores in the insulation coating can be obtained by, first, randomly selecting ordinarily 10 or more pores from the SEM image of the cross section of the insulation coating, second, obtaining the equivalent circle diameters of respective pores, and third, calculating the average value of them.

While a range of the pore diameter (a variation of the pore diameter) of the pores in the insulation coating is not limited, 90% of the pores ordinarily have the pore diameter in a range of 50% to 150% of the average diameter. For example, when the average diameter of the pores in the insulation coating is 50 μm, 90% of the pores in the insulation coating have the pore diameter in a range of 25 μm to 75 μm.

The coated electric wire for winding of the present disclosure includes the constant amount of the specific pores in the insulation coating to suppress erosion due to partial discharge of the insulation coating in comparison with the wire of the related art. Accordingly, corresponding to the purpose of the coated electric wire for winding, it is only necessary for the insulation coating to have a total coating thickness equivalent to an insulation coating thickness of the related art when insulation lifetime is desired to be extended while a physical size of a motor is maintained, or it is only necessary for the insulation coating to have a total coating thickness thinner than an insulation coating thickness of the related art when a motor is desired to be downsized while insulation lifetime is maintained.

Figure 4:
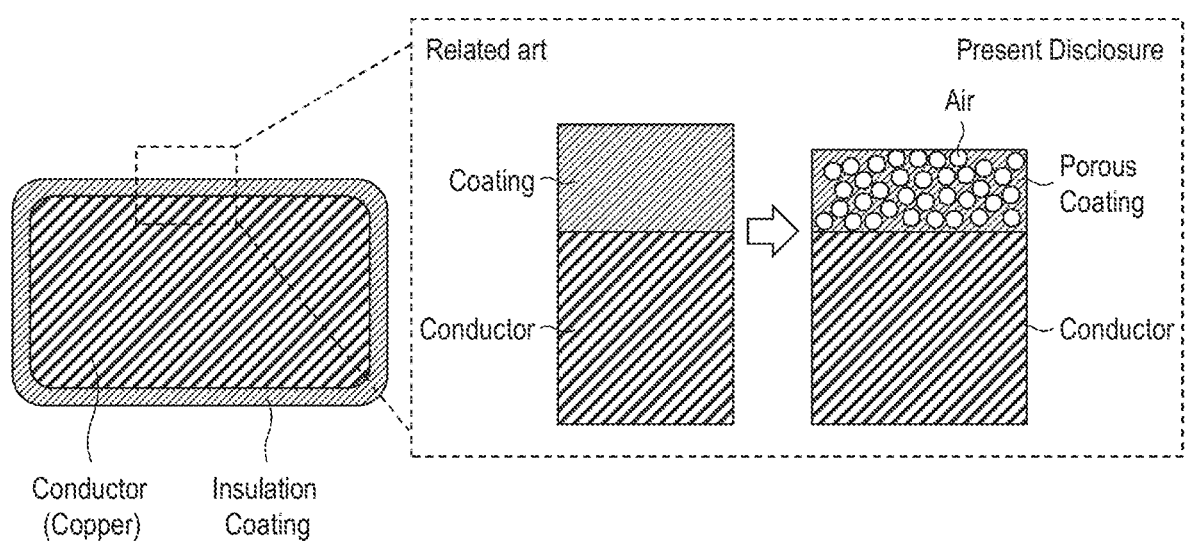
FIG. 4 is a drawing comparing a coated electric wire for winding of a related art with a coated electric wire for winding of the present disclosure.

FIG. 4 is a drawing comparing a coated electric wire for winding of the related art with the coated electric wire for winding of the present disclosure. FIG. 4 indicates that the insulation coating of the coated electric wire for winding of the present disclosure includes the constant volume of the pores having the average diameter equal to or more than the pore diameter (A) obtained by the specific measuring method. Therefore, the reduced permittivity of the insulation coating is achieved to improve the insulation property, and thus the erosion due to partial discharge is suppressed compared with the wire of the related art. Consequently, the total coating thickness of the insulation coating can be thinned compared with the insulation coating thickness of the related art.

The coated electric wire for winding of the present disclosure can be used for, for example, a generator, an auxiliary motor, a drive motor for a hybrid vehicle, an electric vehicle, and the like.

Figure 5:
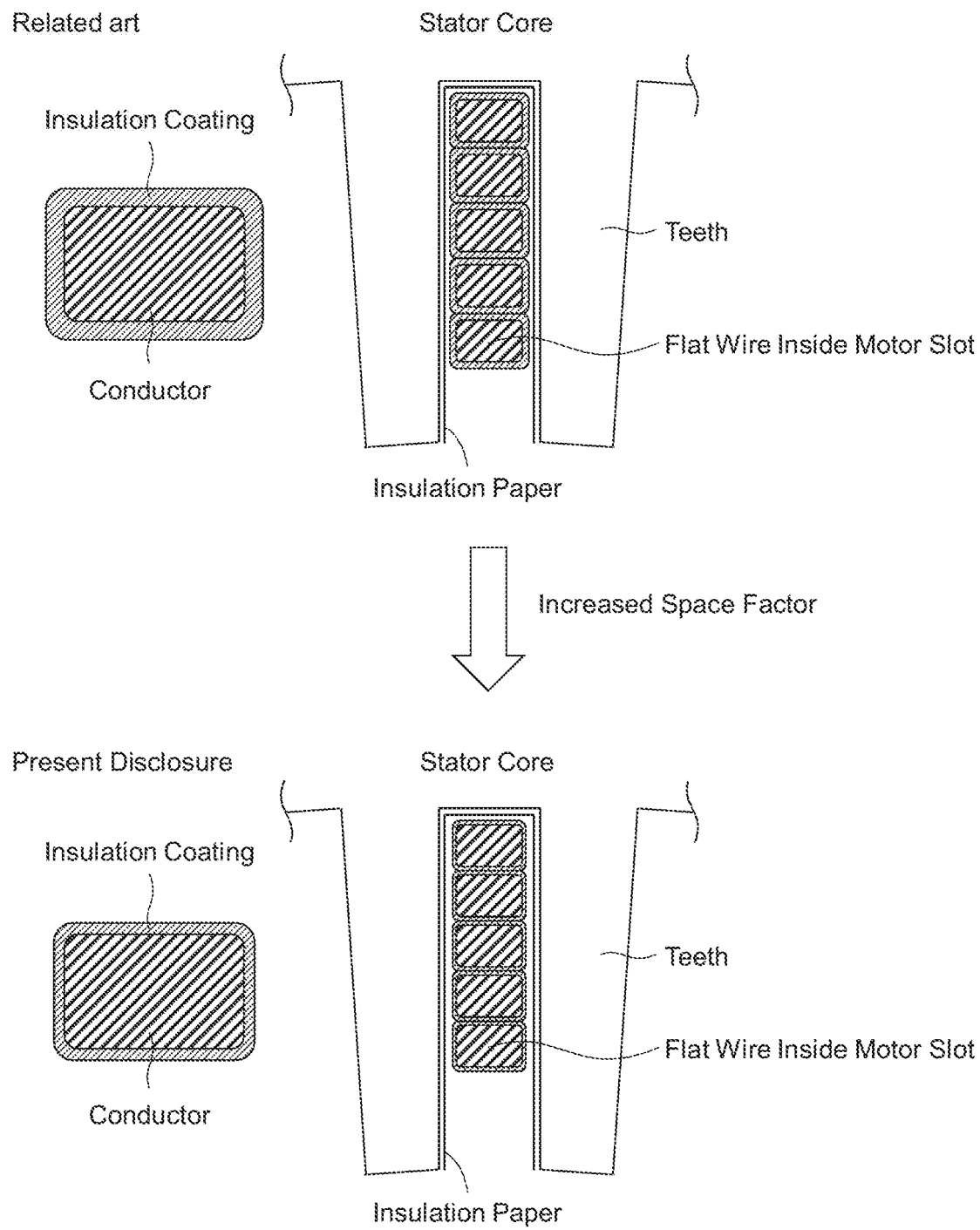
FIG. 5 is a drawing comparing a motor in which the coated electric wire for winding of the related art is introduced to a stator core with a motor in which the coated electric wire for winding of the present disclosure is introduced to a stator core.

FIG. 5 is a drawing comparing a motor in which the coated electric wire for winding of the related art is introduced to a stator core with a motor in which the coated electric wire for winding of the present disclosure is introduced to a stator core. FIG. 5 indicates that the total coating thickness of the insulation coating of the coated electric wire for winding of the present disclosure is thinner than the insulation coating thickness of the related art. Therefore, the motor in which the coated electric wire for winding of the present disclosure is introduced to the stator core has the increased conductor area to ensure improved space factor. Furthermore, the improved torque density because of the increased current ensures downsizing, and the reduced resistivity ensures decrease in copper loss.

The coated electric wire for winding of the present disclosure can be manufactured by applying a material for forming a coating to the conductor and curing it to form an insulation coating using a method ordinarily used in the technical field excluding that the pores are formed in the insulation coating.

For the coated electric wire for winding of the present disclosure, a method for forming the pores in the insulation coating includes (1) a method using a hollow material as a pore source, (2) a method for making an insulation coating porous, and the like.

(1) Method Using Hollow Material as Pore Source

In the method (1), the pores are formed by adding a hollow material, such as hollow silica particles, to an insulating resin and/or an organic solvent in a manufacturing method of the coated electric wire for winding ordinarily used in the technical field.

As the hollow silica particles, the above-described commercially available hollow silica particles can be used. For example, the hollow silica particles can be manufactured such that a shell is formed on a surface of a nucleus particle as a support body, such as a calcium carbonate spherical particle, and subsequently, the nucleus particle is removed by, for example, flowing out using an acid.

As an exemplary coated electric wire for winding of the present disclosure, for example, a coated electric wire for winding in which an insulation coating is formed on a conductor is obtained by an extrusion molding of the conductor with a mixed solution for the insulation coating containing an organic solvent, a resin, and an appropriate amount of a hollow material, or by repeatedly applying the mixed solution for the insulation coating. An insulation coating may be further formed on the insulation coating of the obtained coated electric wire for winding by the extrusion molding of the obtained coated electric wire for winding with the mixed solution for the insulation coating or by repeatedly applying the mixed solution for the insulation coating. A plurality of layers, for example, five layers or more, of the insulation coating may be formed on the conductor. Here, as the organic solvent, an organic solvent that can dissolve a resin is used, and for example, when a PI resin is used as the resin, N-methyl pyrrolidone (NMP) can be used as the organic solvent.

Figure 6:
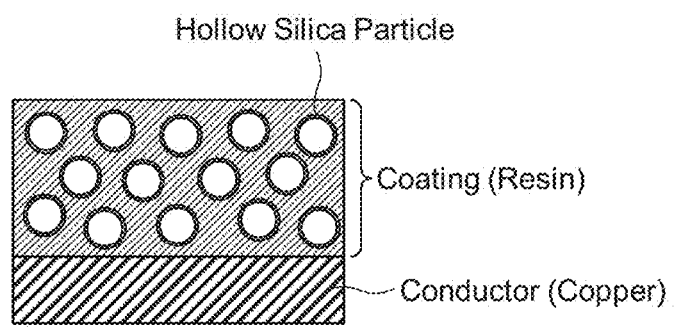
FIG. 6 is a schematic drawing illustrating a coated electric wire for winding in which an insulation coating includes an insulating resin and hollow silica particles.

FIG. 6 is a schematic drawing illustrating the coated electric wire for winding in which the insulation coating includes the insulating resin and the hollow silica particles.

(2) Method for Making Insulation Coating Porous

The method (2) includes, for example, a method using a material removable during the treatment as a pore source. The pores are formed by adding a material, which is removable in a post-treatment and does not dissolve in an insulating resin and/or an organic solvent, to the insulating resin and/or the organic solvent, and removing the material in the post-treatment in a manufacturing method of the coated electric wire for winding ordinarily used in the technical field.

For example, when a treatment with hydrochloric acid is performed as the post-treatment, particles are eluted with a diluted hydrochloric acid. For example, when a heat treatment is performed as the post-treatment, a thermally degradable polymer is used as the removable material. For example, when a solvent removal is performed as the post-treatment, a surfactant micelle is used as the removable material.

In addition, the method (2) includes, for example, a method using a foaming agent, such as the thermally degradable polymer, as the pore source. The pores are formed by adding the foaming agent to the insulating resin and/or the organic solvent to cause foaming in the post-treatment in a manufacturing method of the coated electric wire for winding ordinarily used in the technical field.

Furthermore, the method (2) includes, for example, a method where the pores are formed by preliminarily forming an insulation coating on a surface of a conductor, impregnating the insulation coating with a fluid in a supercritical state or a subcritical state, and subsequently, sharply reducing a pressure to gasify the fluid, and a method where the pores are formed by forming a microphase-separated structure in the insulation coating, and selectively removing some phases by, for example, an appropriate solvent, a supercritical fluid, and further, thermal decomposition.

Figure 7:
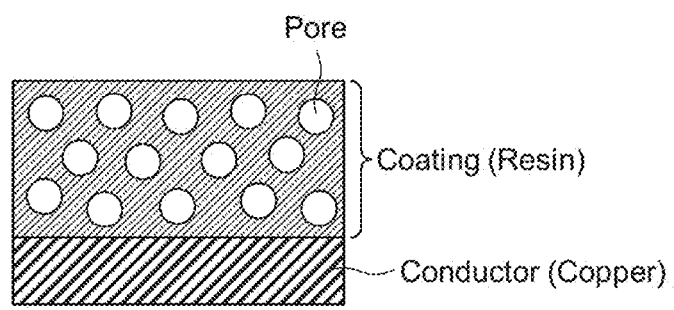
FIG. 7 is a schematic drawing illustrating a coated electric wire for winding in which an insulation coating includes an insulating resin and pores.

FIG. 7 is a schematic drawing illustrating the coated electric wire for winding in which the insulation coating includes the insulating resin and the pores.

EXAMPLES

While the following describes some Examples according to the present disclosure, the description is not intended to limit the present disclosure to such examples.

I. Determination of Lower Limit Value of Average Diameter of Pores in Insulation Coating (i) Step of preparing a specimen having one first hollow silica particle disposed between mutually opposed two electrodes in an insulating resin (1) An epoxy spacer was manufactured on a glass slide (thickness about 250 mm, room-temperature curing type epoxy (main agent: CY-221, curing agent: HY-2967)).

(2) Two electrodes (copper tapes having thickness of 80 μm) were disposed so as to be mutually opposed on the epoxy resin at an interval of 500 μm.

(3) Molding was performed between the electrodes with an uncured epoxy resin.

(4) A syringe was used to arrange a first hollow silica particle (spherical hollow silica particle, particle size 30 μm, shell thickness 1 μm) between the electrodes.

(5) The epoxy resin was cured at room temperature.

Figure 8:
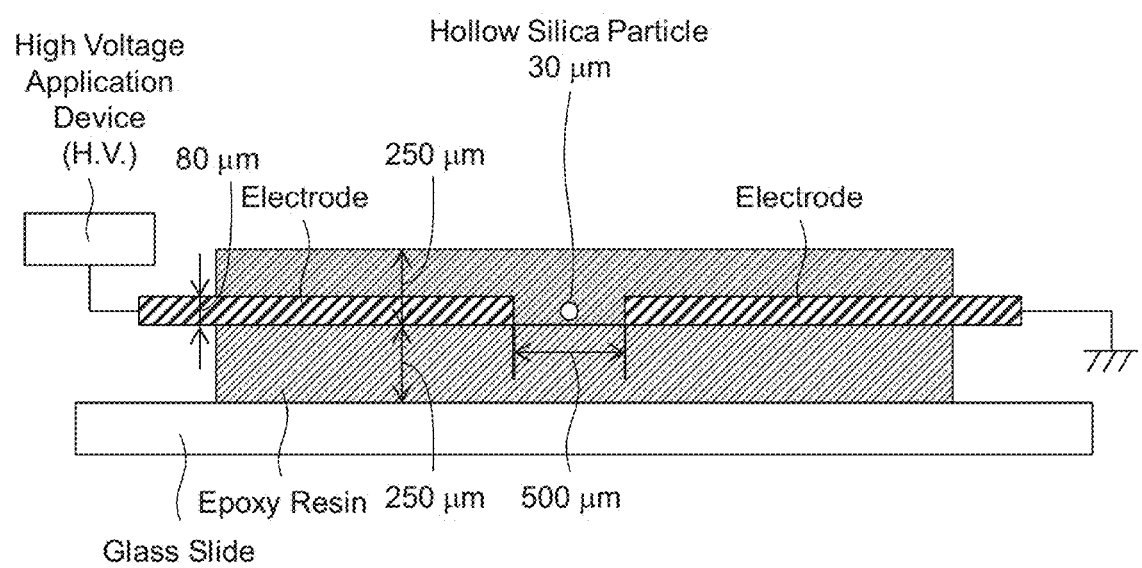
FIG. 8 is a schematic drawing illustrating a specimen (wherein hollow silica particle having particle size of 30 μm is used) prepared in (5) of Step (i) in "I. Determination of Lower Limit Value of Average Diameter of Pores in Insulation Coating" in Example.

FIG. 8 is a schematic drawing illustrating the specimen prepared in (5).

(ii) Step of applying voltage between mutually opposed two electrodes of specimen prepared in step (i) and measuring PDIV The specimen prepared in (5) of Step (i) was arranged in a silicone oil, and the voltage was applied between the mutually opposed two electrodes, and the PDIV was measured. As a result, the PDIV was 13.6 kVp.

Figure 9:
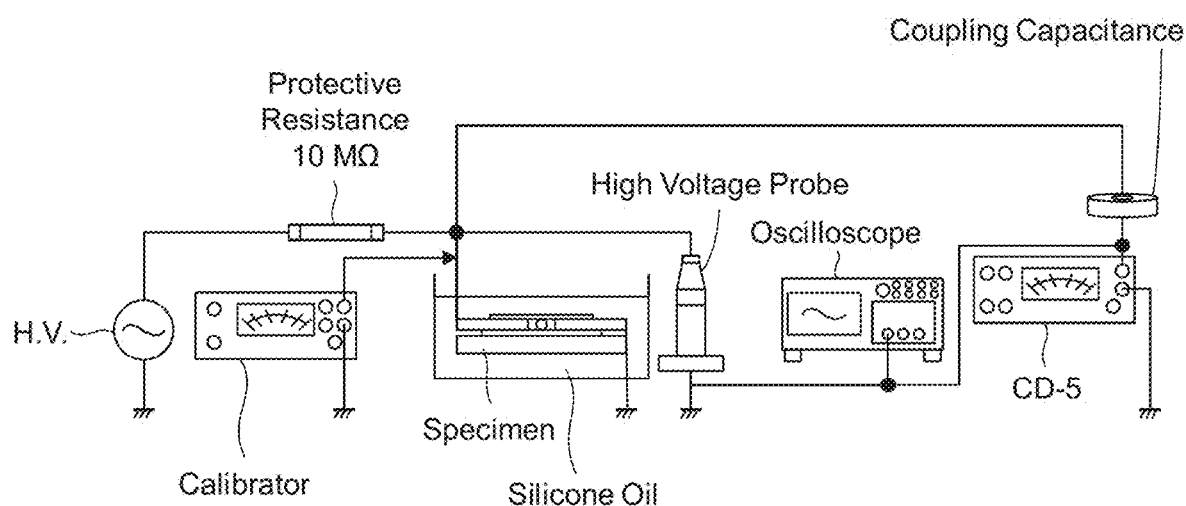
FIG. 9 is a schematic drawing illustrating a system circuit for measuring a PDIV used in Step (ii) in "L. Determination of Lower Limit Value of Average Diameter of Pores in Insulation Coating" in Example.

FIG. 9 is a schematic drawing illustrating a system circuit for measuring a PDIV used in Step (ii).

(iii) Step of obtaining first shared voltage Va of pore in first hollow silica particle from PDIV measured in step (ii)

The first shared voltage Va of the pore in the first hollow silica particle was obtained based on the following formula.

$$Va = \frac{3\varepsilon_{r-e} \times V \times d_a}{(\varepsilon_{r-a} + 2\varepsilon_{r-e}) \times d}[Vp] \qquad [\text{Math. 3}]$$

To the above-described formula, $\varepsilon_{r-e}=6$, V=13.6 kVp, $d_a$ (first pore diameter)=28 μm, $\varepsilon_{r-a}=1$, and d=500 μm were assigned. As a result, Va was calculated to be 1.1 kVp.

Figure 10:
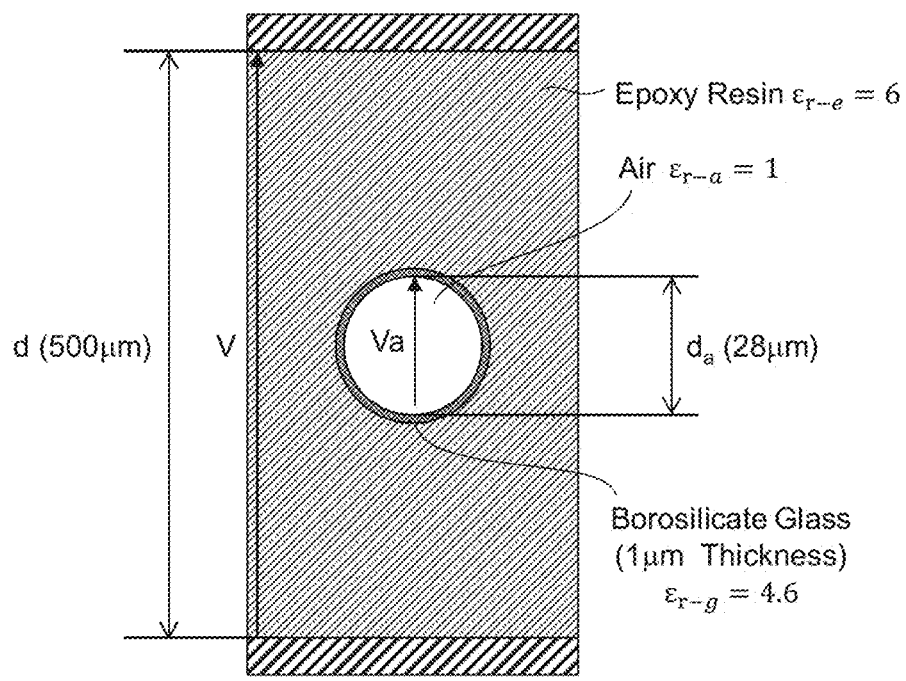
FIG. 10 is a schematic drawing illustrating a calculation model of a first shared voltage Va of a pore in the first hollow silica particle (particle size 30 μm) used in Step (iii) in "I. Determination of Lower Limit Value of Average Diameter of Pores in Insulation Coating" in Example.

FIG. 10 is a schematic drawing illustrating a calculation model of the first shared voltage Va of the pore in the first hollow silica particle used in step (iii).

(iv) Step of performing above-described steps (i) to (iii) for one type of second or third hollow silica particle having second or third pore diameter different from first pore diameter of first hollow silica particle used in step (i) to obtain second or third shared voltage Va with respect to second or third pore diameter $d_a$ of second or third hollow silica particle (iv-1)

Figure 11:
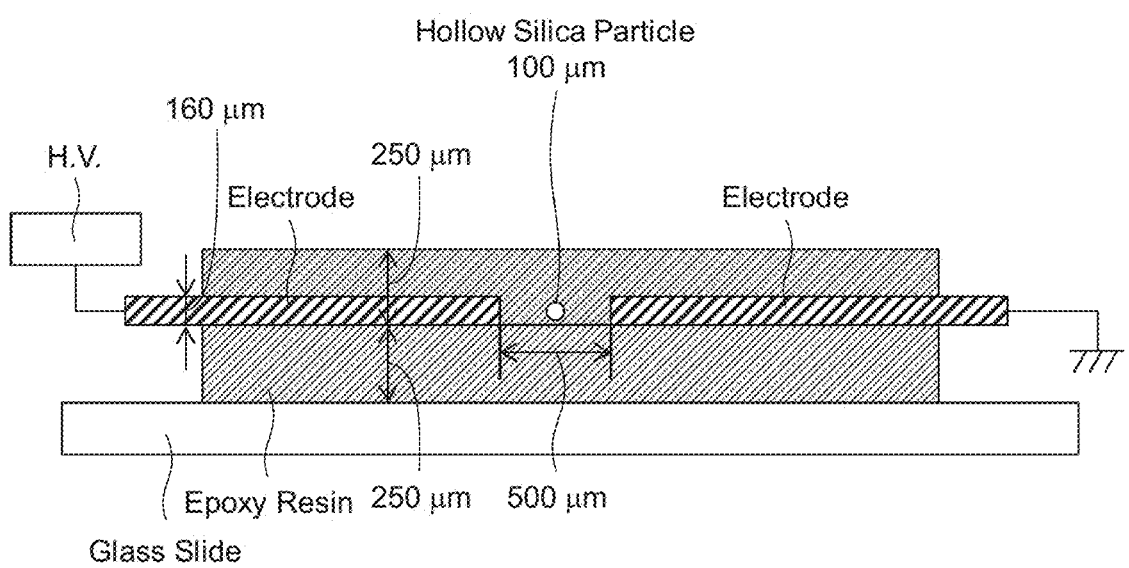
FIG. 11 is a schematic drawing illustrating a specimen (wherein hollow silica particle having particle size of 100 μm was used) prepared in (5) of Step (i) in Step (iv-1) in "I. Determination of Lower Limit Value of Average Diameter of Pores in Insulation Coating" in Example.
Figure 12:
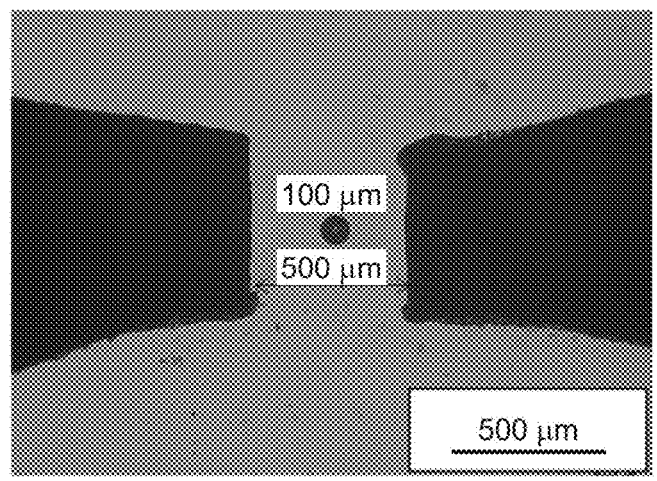
FIG. 12 is an optical photograph of the specimen (wherein hollow silica particle having particle size of 100 μm was used) prepared in (5) of Step (i) in Step (iv-1) in "I. Determination of Lower Limit Value of Average Diameter of Pores in Insulation Coating" in Example which was imaged from directly upper direction of FIG. 11.

For a second hollow silica particle (spherical hollow silica particle, particle size 100 μm, shell thickness 1 μm), the above-described steps (i) to (iii) were performed using copper tapes having a thickness of 160 μm as the two electrodes. FIG. 11 is a schematic drawing illustrating a specimen, wherein the second hollow silica particle having the particle size of 100 μm was used, prepared in Step (i). FIG. 12 is an optical photograph of the specimen, wherein the second hollow silica particle having the particle size of 100 μm was used, prepared in Step (i), which was imaged from directly upper direction of FIG. 11. The second shared voltage Va for the second pore diameter $d_a$ (98 μm) of the second hollow silica particle was obtained as follows.

Figure 13:
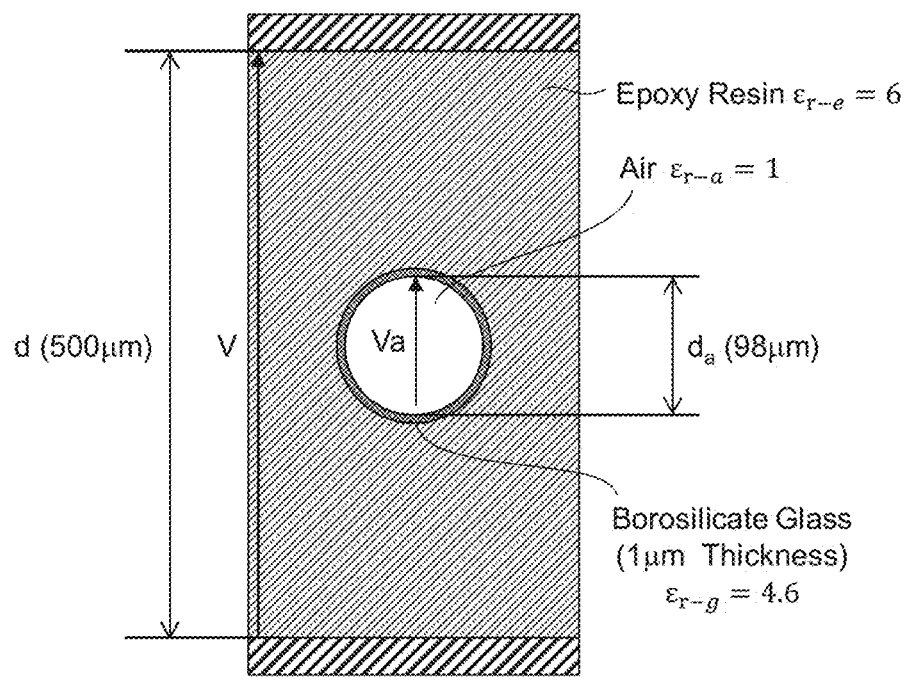
FIG. 13 is a schematic drawing illustrating a calculation model of a second shared voltage Va of a pore in the second hollow silica particle (particle size 100 μm) used in Step (iii) in Step (iv-1) in "I. Determination of Lower Limit Value of Average Diameter of Pores in Insulation Coating" in Example.

As a result of step (ii) of the second hollow silica particle having the particle size of 100 μm, the PDIV was 26.8 kVp. The second shared voltage Va of the pore in the second hollow silica particle was obtained based on the following formula using a calculation model of the second shared voltage Va of the pore in the second hollow silica particle having the particle size of 100 μm illustrated in FIG. 13.

$$Va = \frac{3\varepsilon_{r-e} \times V \times d_a}{(\varepsilon_{r-a} + 2\varepsilon_{r-e}) \times d}[Vp] \qquad [\text{Math. 4}]$$

To the above-described formula, $\varepsilon_{r-e}=6$, V=26.8 kVp, $d_a$ (second pore diameter)=98 μm, $\varepsilon_{r-a}=1$, and d=500 μm were assigned. As a result, Va was calculated to be 7.3 kVp.

(iv-2)

Figure 14:
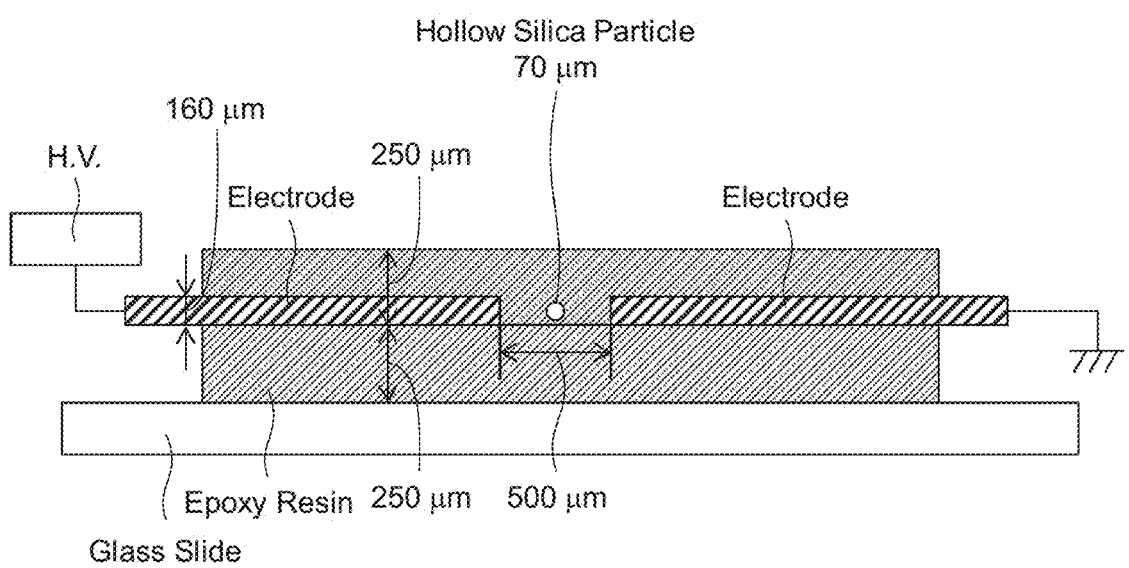
FIG. 14 is a schematic drawing illustrating a specimen (wherein hollow silica particle having particle size of 70 μm is used) prepared in (5) of Step (i) in Step (iv-2) in "I. Determination of Lower Limit Value of Average Diameter of Pores in Insulation Coating" in Example.

For a third hollow silica particle (spherical hollow silica particle, particle size 70 m, shell thickness 1 μm), the above-described steps (i) to (iii) were performed using copper tapes having a thickness of 160 μm as the two electrodes. FIG. 14 is a schematic drawing illustrating a specimen, wherein the third hollow silica particle having the particle size of 70 μm was used, prepared in Step (i). The third shared voltage Va for the third pore diameter $d_a$ (68 μm) of the third hollow silica particle was obtained as follows.

Figure 15:
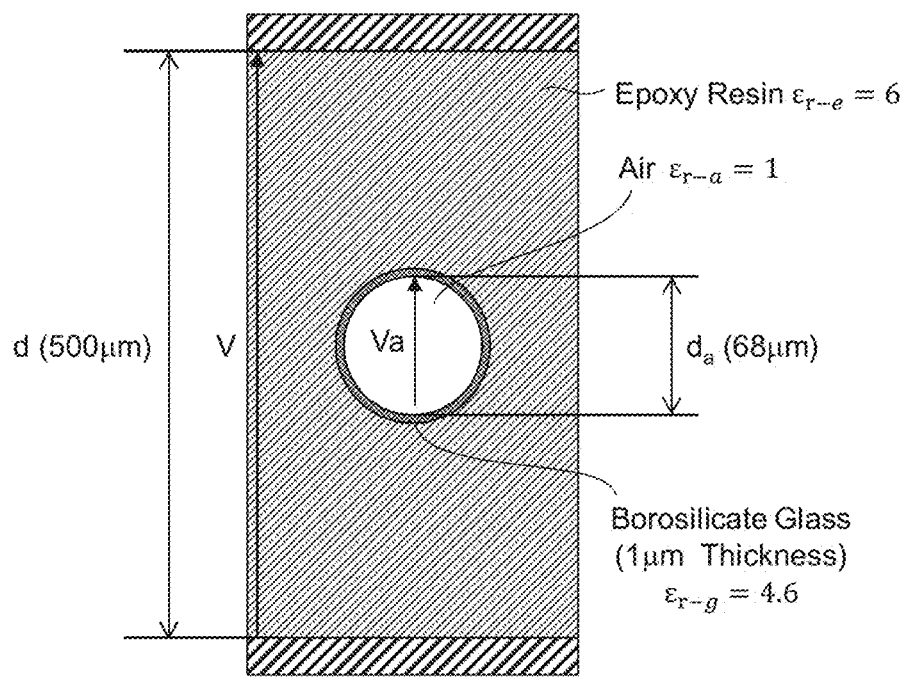
FIG. 15 is a schematic drawing illustrating a calculation model of a third shared voltage Va of a pore in the third hollow silica particle (particle size 70 μm) used in Step (iii) in Step (iv-2) in "I. Determination of Lower Limit Value of Average Diameter of Pores in Insulation Coating" in Example.

As a result of step (ii) of the third hollow silica particle having the particle size of 70 μm, the PDIV was 14.4 kVp. The third shared voltage Va of the pore in the third hollow silica particle was obtained based on the following formula using a calculation model of the third shared voltage Va of the pore in the third hollow silica particle having the particle size of 70 μm illustrated in FIG. 15.

$$Va = \frac{3\varepsilon_{r-e} \times V \times d_a}{(\varepsilon_{r-a} + 2\varepsilon_{r-e}) \times d}[Vp] \qquad [\text{Math. 5}]$$

To the above-described formula, $\varepsilon_{r-e}=6$, V=14.4 kVp, $d_a$ (third pore diameter)=68 μm, $\varepsilon_{r-a}=1$, and d=500 μm were assigned. As a result, Va was calculated to be 2.7 kVp.

(v) Step of plotting value represented by first shared voltage Va versus first pore diameter $d_a$ of first hollow silica particle obtained in step (iii), and value represented by second shared voltage Va versus second pore diameter $d_a$ of second hollow silica particle and value represented by third shared voltage Va versus third pore diameter $d_a$ of third hollow silica particle obtained in step (iv) to generate curve in relationship diagram between pore diameter (x-axis) and voltage (y-axis)

Figure 16:
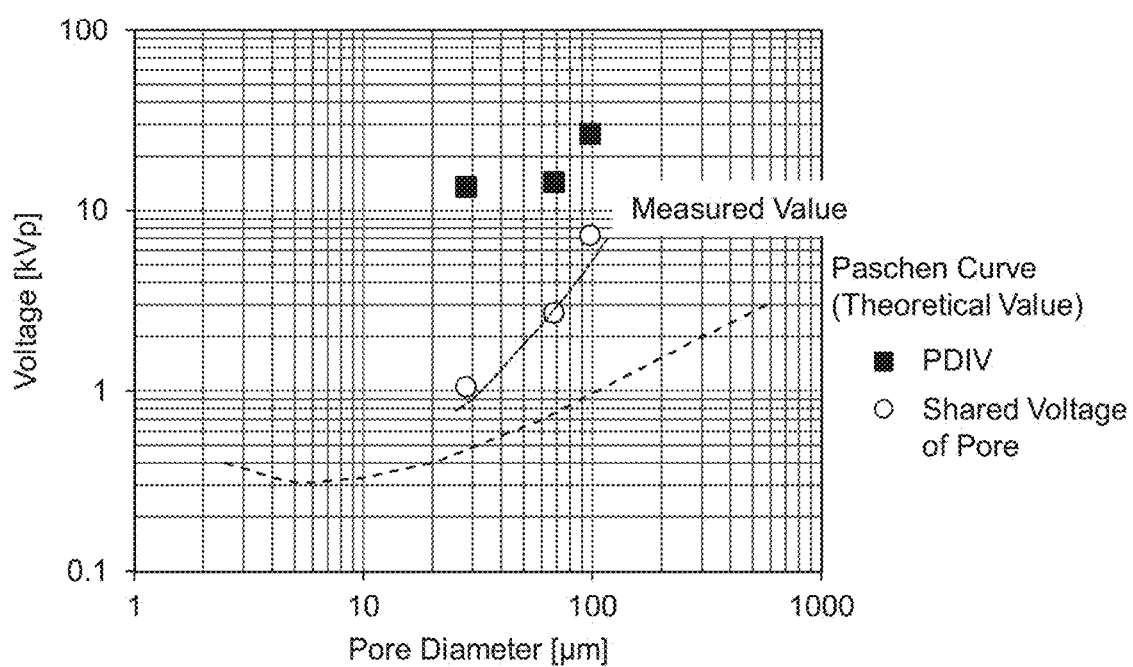
FIG. 16 is a drawing illustrating a relation between pore diameter (x-axis) and voltage (y-axis) generated by plotting a value (pore diameter=28 μm. Va=1.1 kVp) of the first hollow silica particle (particle size 30 μm, shell thickness 1 μm) obtained in Step (iii), and a value (pore diameter=98 μm, Va=7.3 kVp) of the second hollow silica particle (particle size 100 μm, shell thickness 1 μm) and a value (pore diameter=68 μm, Va=2.7 kVp) of the third hollow silica particle (particle size 70 μm, shell thickness 1 μm) obtained in Step (iv) in "I. Determination of Lower Limit Value of Average Diameter of Pores in Insulation Coating" in Example.

In a relationship diagram between the pore diameter (x-axis) and the voltage (y-axis), a value (first pore diameter=28 μm, Va=1.1 kVp) of the first hollow silica particle (particle size 30 μm, shell thickness 1 μm) obtained in Step (iii), and a value (second pore diameter=98 μm, Va=7.3 kVp) of the second hollow silica particle (particle size 100 μm, shell thickness 1 μm) and a value (third pore diameter=68 μm, Va=2.7 kVp) of the third hollow silica particle (particle size 70 μm, shell thickness 1 μm) obtained in Step (iv) were plotted to generate a curve. FIG. 16 illustrates the result.

In FIG. 16, a Paschen curve (theoretical value) was generated based on the following formula.

$$V = \frac{Bpd}{\ln\left\{\frac{Apd}{\phi}\right\}} \qquad \{\text{Math. 6}\}$$

[In the formula, A is 11.3 $m^{-1}Pa^{-1}$, B is 274 V/(mPa), pd is a distance between the electrodes corresponding to the pore diameter in FIG. 16, and Φ is an impact ionization coefficient.]

(vi) Step of obtaining pore diameter (A) for withstand voltage required for insulation coating from curve obtained in step (v)

Corresponding to a withstand voltage required for the insulation coating, the pore diameter (A) can be arbitrarily obtained from the curve obtained in Step (v).

II. Preparing Insulation Coating Including Pores (Sample Prepared by Method A)

(1) A copper plate to which polyimide was applied as a base layer was put in a drying furnace preliminarily warmed to 150° C. and heated for one hour, and subsequently, the temperature of the drying furnace was raised to 250° C. and the copper plate was heated for one hour. The thickness of the polyimide layer as the base layer was adjusted to about 9 μm.

(2) Polymethylmethacrylate microparticles were added to polyimide, and a stirrer was further added, and stirring was performed with stirrer.

(3) The varnish prepared in (2) was applied over the copper plate of (1) on which polyimide was baked as the base layer with an applicator, and the obtained matter was put in the drying furnace preliminarily warmed to 150° C. and heated for one hour, and subsequently, the temperature of the drying furnace was raised to 250° C. and the obtained matter was heated for one hour, and subsequently, the temperature of the drying furnace was raised to 300° C. and the obtained matter was heated for one hour.

(4) (1) to (3) were repeated six times to obtain samples A-1 to A-6.

(Comparative Samples without Pores)

(1) A copper plate to which polyimide was applied was put in the drying furnace preliminarily warmed to 150° C. and heated for one hour, and subsequently, the temperature of the drying furnace was raised to 250° C. and the copper plate was heated for one hour.

(2) (1) was repeated twice to obtain B-1 and B-2.

III. Analysis of Insulation Coatings Prepared in II (Porosity, Coating Thickness, and Average Diameter of Pores of Insulation Coating)

For the obtained samples A-1 to A-6, it was confirmed that the porosity, the coating thickness, and the average diameter of the pores of the insulation coating were adjusted corresponding to the withstand voltage required for the insulation coating from, for example, the SEM image of the cross section of the insulation coating when the electric wire was cut perpendicular to the longitudinal direction.

(PDIV Measurement)

Figure 17:
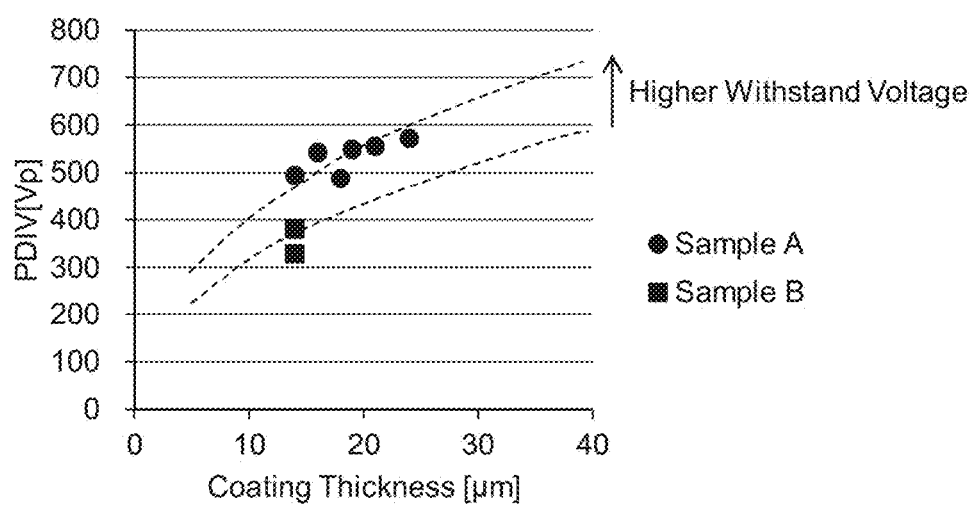
FIG. 17 is a drawing illustrating a relation between coating thickness and PDIV for samples A-1 to A-6, B-1, and B-2.

For the obtained samples A-1 to A-6, B-1, and B-2, the PDIVs were measured. FIG. 17 illustrates the result.

It was seen from FIG. 17 that the PDIVs of A-1 to A-6 became high compared with the PDIVs of B-1 and B-2. Accordingly, it was seen that the present disclosure provides the insulation coating having the higher withstand voltage.

(Relative Permittivity Measurement)

Figure 18:
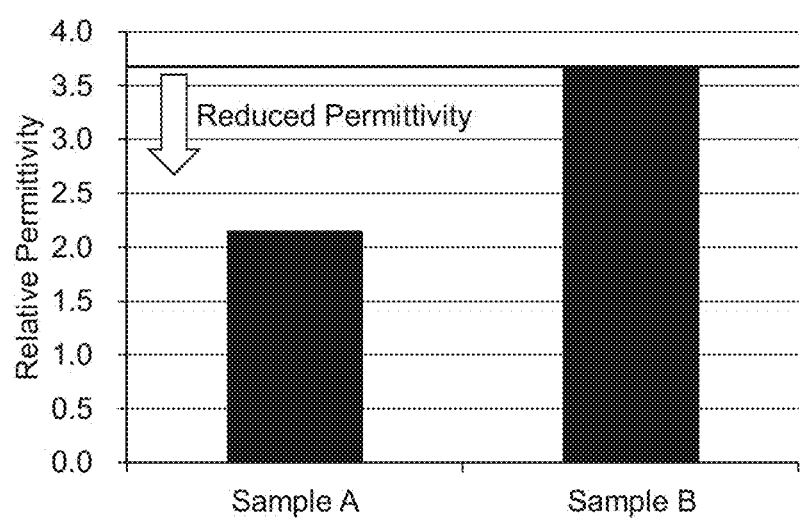
FIG. 18 is a drawing illustrating average values of relative permittivities of the sample A (polyimide+pores) and the sample B (polyimide).

For the obtained samples A and samples B, the relative permittivities were measured. FIG. 18 illustrates the result of the average values of the relative permittivities of respective samples.

It was seen from FIG. 18 that the relative permittivities of the samples A became low compared with the relative permittivities of the samples B. Accordingly, it was seen that the present disclosure ensures the reduced permittivity of the insulation coating.

All publications, patents and patent applications cited in the present description are herein incorporated by reference as they are.

What is claimed is:

1. A coated electric wire for winding, comprising:
   a conductor; and
   an insulation coating that coats a periphery of the conductor,
   wherein the insulation coating includes pores and an insulating resin,
   wherein the insulation coating includes the pores in an amount of 25% by volume to 75% by volume based on a total volume of the insulation coating in the insulating resin, and
   wherein an average diameter of the pores obtained from a SEM image of a cross section of the insulation coating when the electric wire is cut perpendicular to a longitudinal direction thereof is in a range from a pore diameter (A) obtained through the following steps (i) to (vi) to ⅓ of an insulation coating thickness:
   (i) a step of preparing a specimen having one first pore or one first hollow silica particle disposed between mutually opposed two electrodes in an insulating resin;
   (ii) a step of applying a voltage between the mutually opposed two electrodes of the specimen prepared in the step (i) and measuring a partial-discharge inception voltage (PDIV);
   (iii) a step of obtaining a first shared voltage Va of the first pore or a pore in the first hollow silica particle from the PDIV measured in the step (ii) based on a formula below;

$$Va = \frac{3\varepsilon_{r-e} \times V \times d_a}{(\varepsilon_{r-a} + 2\varepsilon_{r-e}) \times d}[Vp] \qquad [\text{Math. 1}]$$

[In the formula, $\varepsilon_{r-e}$ is a relative permittivity of the insulating resin, V is the PDIV measured in the step (ii), $d_a$ is a first pore diameter of the first pore or the first hollow silica particle, $\varepsilon_{r-a}$ is a relative permittivity of air, and d is a distance between the mutually opposed two electrodes]

(iv) a step of performing the steps (i) to (iii) for at least one type of second or later pore or hollow silica particle having a second or later pore diameter different from the first pore diameter of the first pore or the first hollow silica particle used in the step (i) to obtain a second or later shared voltage Va with respect to the second or later pore diameter $d_a$ of the second or later pore or hollow silica particle;
   (v) a step of plotting a value represented by the first shared voltage Va versus the first pore diameter $d_a$ of the first pore or the first hollow silica particle obtained in the step (iii) and at least one value represented by the second or later shared voltage Va versus the second or later pore diameter $d_a$ of the second or later pore or hollow silica particle obtained in the step (iv) to generate a curve in a relationship diagram between the pore diameter (x-axis) and the voltage (y-axis); and
   (vi) a step of obtaining the pore diameter (A) for a withstand voltage required for the insulation coating from the curve obtained in the step (v).

2. The coated electric wire for winding according to claim 1, wherein the insulation coating thickness is 20 μm to 150 μm.

* * * * *